Sept. 20, 1966    M. J. MILLER    3,273,769

UMBRELLA HOLDER FOR AUTOMOBILES

Filed Oct. 6, 1965

INVENTOR.
MARILYN JOY MILLER
BY Morey

United States Patent Office 3,273,769
Patented Sept. 20, 1966

3,273,769
UMBRELLA HOLDER FOR AUTOMOBILES
Marilyn J. Miller, 1440 W. 56th Ave., Gary, Ind.
Filed Oct. 6, 1965, Ser. No. 493,364
2 Claims. (Cl. 224—42.45)

My invention refers generally to automobile accessories, and more particularly to means adapted for attachment to an automobile door for receiving and removably retaining an umbrella of the conventional collapsible type.

Umbrellas of the collapsible type are a well-known article of commerce widely employed for protection against rain, snow and sun, particularly in instances wherein the anticipated exposure to the elements is ordinarily of limited duration; as for example between a parked automobile and a building. However, even a collapsed umbrella is an extremely inconvenient article to carry in an automobile, due in part to its length. When wet, it cannot be laid on the seat beside the driver without transferring water to the seat, and if allowed to stand in the passenger space beside the driver it may become dislodged while the automobile is in motion, possibly obstructing access to vital operating controls and certainly distracting the driver. In either event, a passenger seated beside the driver is harassed and annoyed by the umbrella's presence.

A primary object of my invention to provide means for detachably securing a conventional umbrella in collapsed condition to the inner surface of a door of an automobile.

Another important object of my invention is the provision of a device of the type described which may be attached without difficulty to the inner surface of a door of an automobile in such position as to be easily accessible to the driver when the automobile door is open and yet avoid inconvenience and interference with the driver when the door is closed.

Other important objects of my invention include the provision of a device of the type described which may be inexpensively fabricated, readily adapted to fit a majority of umbrellas, which matches the upholstery applied to the inner surface of the automobile door and which disposes the umbrella in such position that the drainage of water therefrom will not ordinarily contact the driver of the automobile.

Further objects of my invention will become apparent from the following detailed description and from the appended drawings, in which.

Figure 1:
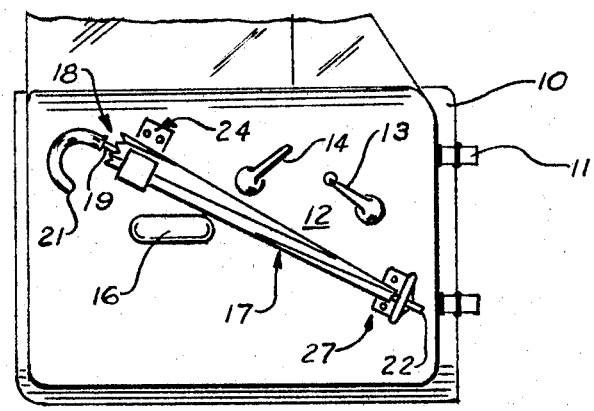
FIGURE 1 is an elevation of an automobile door illustrating my invention applied thereto.
Figure 2:
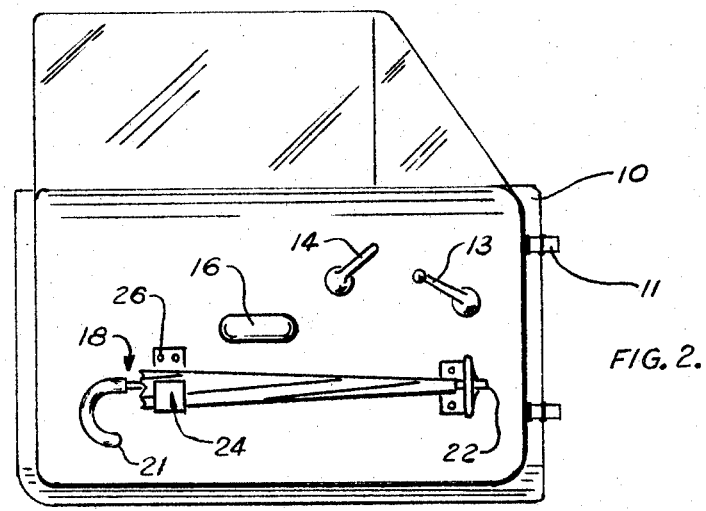
FIGURE 2 is an elevation showing the inner surface of an automobile door illustrating the application of my invention in a somewhat different manner than that shown in FIGURE 1.
Figures 3, 4:
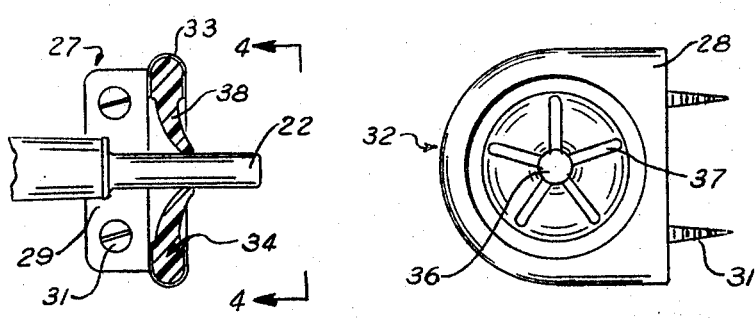
FIGURE 3 is a partially sectioned elevation of an umbrella tip holder forming a portion of my invention.
FIGURE 4 is an end view of the umbrella tip holder illustrated in FIGURE 3.

Referring to FIGURES 1 and 2, I have illustrated a conventional automobile door having a metal body 10 supporting hinges 11 along the leading edge of the door. The inner surface of the door body 10 is conventionally covered with upholstery 12 usually of cloth or synthetic fabric stretched over a form of rigid material such as paperboard (not shown). Projecting from the upholstery 12 is a window control handle 13, a latch handle 14 and an arm rest 16 arranged in spaced roughly triangular configuration as illustrated. Since in most instances it would be most convenient for persons utilizing my invention to attach the device to the driver's door, which in the United States is the front left-hand door, all of the illustrations refer to such application but obviously any other door on the vehicle may be utilized.

A conventional umbrella 17 is shown applied to the door upholstery 12 and includes a handle end, generally designated 18, formed on a stem 19. The actual handle 21 is permanently attached to the stem 19 and may be of any desired shape, either curved or straight. The stem 19 terminates in a cylindrical tip 22, formed on the opposite end of the stem 19 from handle 21. The body 23 of the umbrella is conventionally formed of cloth supported by ribs (not shown) hinged at one end to the stem 19 near the tip 22.

To support the umbrella 17 I provide a handle receiver 24 comprising a strap of metal or synthetic resin formed into a generally J-shaped configuration adapted to receive and support the handle end 18 of the umbrella 17. Openings 26 are formed in the handle receiver near one end of the longer leg to receive self-tapping screws which secure the receiver 24 to the inner surface 12 of the door.

I also provide a tip receiver, generally designated 27, having a frame 28 and an integral flange 29 projecting laterally from the frame 28. The flange 29 defines spaced openings for self-tapping attachment screws 31. The projecting extremity of the frame 28 is preferably of semicircle configuration as indicated at 32 and preferably is of semicircular cross section as indicated at 33, thus defining a rim extended around a centrally disposed opening in frame 28 to receive and retain a tip retainer 34. The tip retainer 34 is preferably formed of resilient material, such as rubber and is of circular configuration adapted to be received and retained by the semicircular cross section 33 of the frame 28. A center opening 36, having a diameter less than the diameter of the umbrella tip 22, is formed in the center of the retainer 34 and communicates with a plurality of radially extended slots 37 each having a length less then the radial dimension of the retainer 34, thus defining a plurality of resilient fingers 38. The frame 28 may be formed of any suitable material, such as metal or plastic and the retainer of rubber of suitable hardness. It should be understood, however, that the tip retainer 34 may be formed integrally with the frame 28 if the material selected is of suitable resiliency. Various synthetic resins commercially available are suitable for this use as well as for the handle receiver 24, and may be colored to match the upholstery.

Automobiles are ordinarily supplied in either the four door or the two door version, the length of the door ordinarily being greater in the case of the two door design. In the latter instance the length of the door is such as to permit mounting of the umbrella 17 in a horizontal or slightly inclined position as shown in FIGURE 2 with the handle receiver 24 disposed below the arm rest 16. With the shorter doors utilized on the four door models it is usually desirable to dispose the umbrella at an angle, as shown in FIGURE 1, with the handle receiver 24 arranged above and to the rear of the arm rest in such manner as to permit the umbrella to extend diagonally between the arm rest 16 and the door handle 14.

In either event the tip receiver 27 is disposed near the leading edge of the door in the lower corner. The umbrella is attached by simply inserting the cylindrical tip 22 in the opening 36 of the tip retainer 34, thus deflecting the resilient fingers 38 and bringing them into frictional engagement with the tip 22. The handle end 18 of the umbrella is then lowered into engagement with the handle receiver 24. When in this position the vehicle door can be opened or closed rapidly without danger of accidentally dislodging the umbrella, which is also adequately secured against accidental dislodgment during operation of the vehicle and yet may be easily withdrawn when the door is opened. If the umbrella is wet when inserted in my device the water will drain toward the tip and fall directly to the floor of the vehicle without contacting the upholstery because the tip is held away from the door upholstery a sufficient distance.

It will be understood that I have described only a preferred embodiment of my invention and that variations in the structure may be made as required. For example, attachment means other than screws may be utilized and the materials of construction varied within the limits defined in the appended claims.

I claim:
1. Apparatus for attachment to an automobile door hinged at the leading edge for receiving and retaining an umbrella having a handle end and an elongated generally cylindrical tip opposite the handle end comprising a handle receiver of generally J-shaped configuration for receiving and supporting the handle portion of the umbrella, said handle receiver including at least one fastener receiving opening for attachment of the handle receiver to said car door and a tip receiver having a frame portion defining a fastener receiving opening for attachment of the tip receiver to said car door in a position spaced from the handle receiver and adjacent the leading edge of said door, said tip receiver having a retainer portion carried by the frame portion, said retainer portion being a disc of resilient material defining a central opening of a diameter slightly less than the diameter of the cylindrical tip on the umbrella and a plurality of radially extended slots through said disc projecting from the central opening outwardly a distance less than the radius of said disc, thereby defining resilient fingers between the slots for resilient frictional engagement with said umbrella tip.

2. The structure defined in claim 1 wherein the axis of the tip receiving opening is disposed at ninety degrees to the axis of the fastener receiving opening.

References Cited by the Examiner
UNITED STATES PATENTS

| | | |
|---|---|---|
| 239,874 | 4/1881 | Southwood. |
| 309,841 | 12/1884 | Floyd. |
| 1,086,200 | 2/1914 | Michie. |
| 2,823,808 | 2/1958 | Hindi. |

GERALD M. FORLENZA, *Primary Examiner.*

F. WERNER, *Assistant Examiner.*